United States Patent [19]

Turchan

[11] Patent Number: 6,012,882
[45] Date of Patent: Jan. 11, 2000

[54] COMBINED HOLE MAKING, THREADING, AND CHAMFERING TOOL WITH STAGGERED THREAD CUTTING TEETH

[76] Inventor: Manuel C. Turchan, 42288 Crestview, Northville, Mich. 48167

[21] Appl. No.: 08/779,452

[22] Filed: Jan. 7, 1997

Related U.S. Application Data

[63] Continuation-in-part of application No. PCT/US96/14760, Sep. 12, 1995.
[60] Provisional application No. 60/003,634, Sep. 12, 1995.

[51] Int. Cl.$^7$ ............................................. B23G 5/20
[52] U.S. Cl. ........................ 409/74; 408/222; 409/65; 409/66; 470/198
[58] Field of Search .................. 409/74, 65, 66; 408/222, 223, 224, 226, 228, 229; 407/53, 58, 63, 113; 470/198, 199; 7/157, 158, 159

[56] References Cited

U.S. PATENT DOCUMENTS

| | | | |
|---|---|---|---|
| 624,156 | 5/1899 | Balcom | 408/222 |
| 1,365,338 | 1/1921 | Muth | 408/222 |
| 3,877,099 | 4/1975 | Halpern | 470/199 |
| 4,761,844 | 8/1988 | Turchan | 470/199 |
| 4,831,674 | 5/1989 | Bergstrom et al. | 10/140 |
| 4,930,949 | 6/1990 | Giessler | 408/222 |
| 4,934,040 | 6/1990 | Turchan | 409/74 X |
| 4,943,191 | 7/1990 | Schmitt | 408/1 R |
| 5,080,538 | 1/1992 | Schmitt | 409/66 |
| 5,088,861 | 2/1992 | Little | 408/233 X |
| 5,143,492 | 9/1992 | Leeb | 409/74 |
| 5,176,477 | 1/1993 | Noggle | 408/59 |
| 5,429,459 | 7/1995 | Palm | 409/66 |

FOREIGN PATENT DOCUMENTS

| | | | |
|---|---|---|---|
| 429917 | 6/1991 | European Pat. Off. | 470/199 |
| 109443 | 3/1918 | United Kingdom | 470/198 |

OTHER PUBLICATIONS

Copy of first page of Application No. PCT/US96/14760.

*Primary Examiner*—Andrea L. Pitts
*Assistant Examiner*—Henry W. H. Tsai
*Attorney, Agent, or Firm*—Harness, Dickey & Pierce, P.L.C.

[57] ABSTRACT

Solid tungsten carbide is the popular material for these combinations tools. High resultant side forces on the tool during the thread milling phase are caused by relatively high circumferential engagement of the tool and a very low feed per tooth (chip thickness). A combined hole making, threading and chamfering tool with staggered thread cutting teeth doubles chip thickness and reduces side forces (resulting in less engagement), consequently allowing the feed rate to be increased while reducing thread milling time. In addition, this arrangement also reduces tool chatter, thus providing a smoother surface finish in the thread. In one form, the cutting teeth are formed on one or more removable inserts, facilitating replacement or substitution thereof.

17 Claims, 6 Drawing Sheets

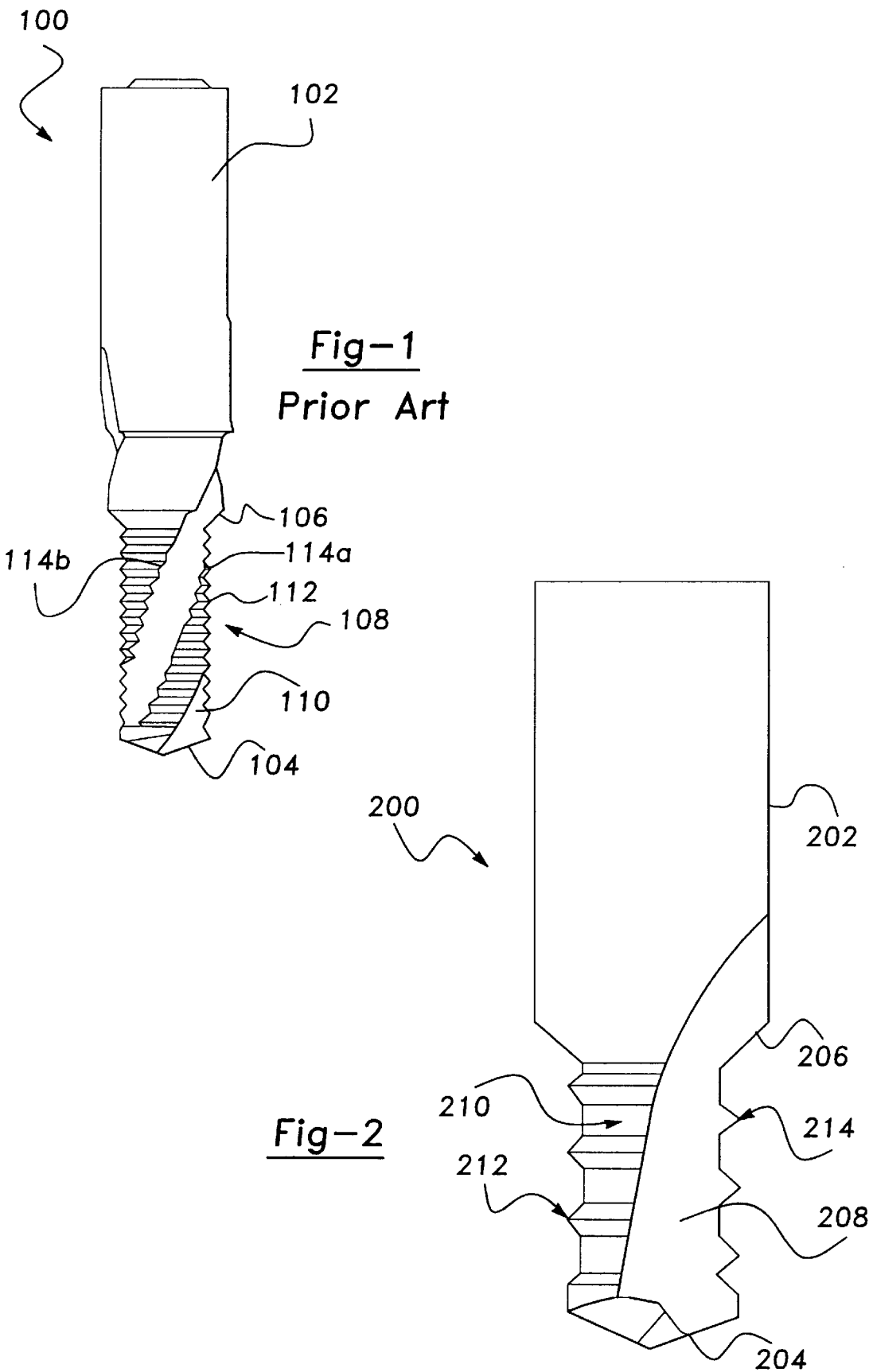

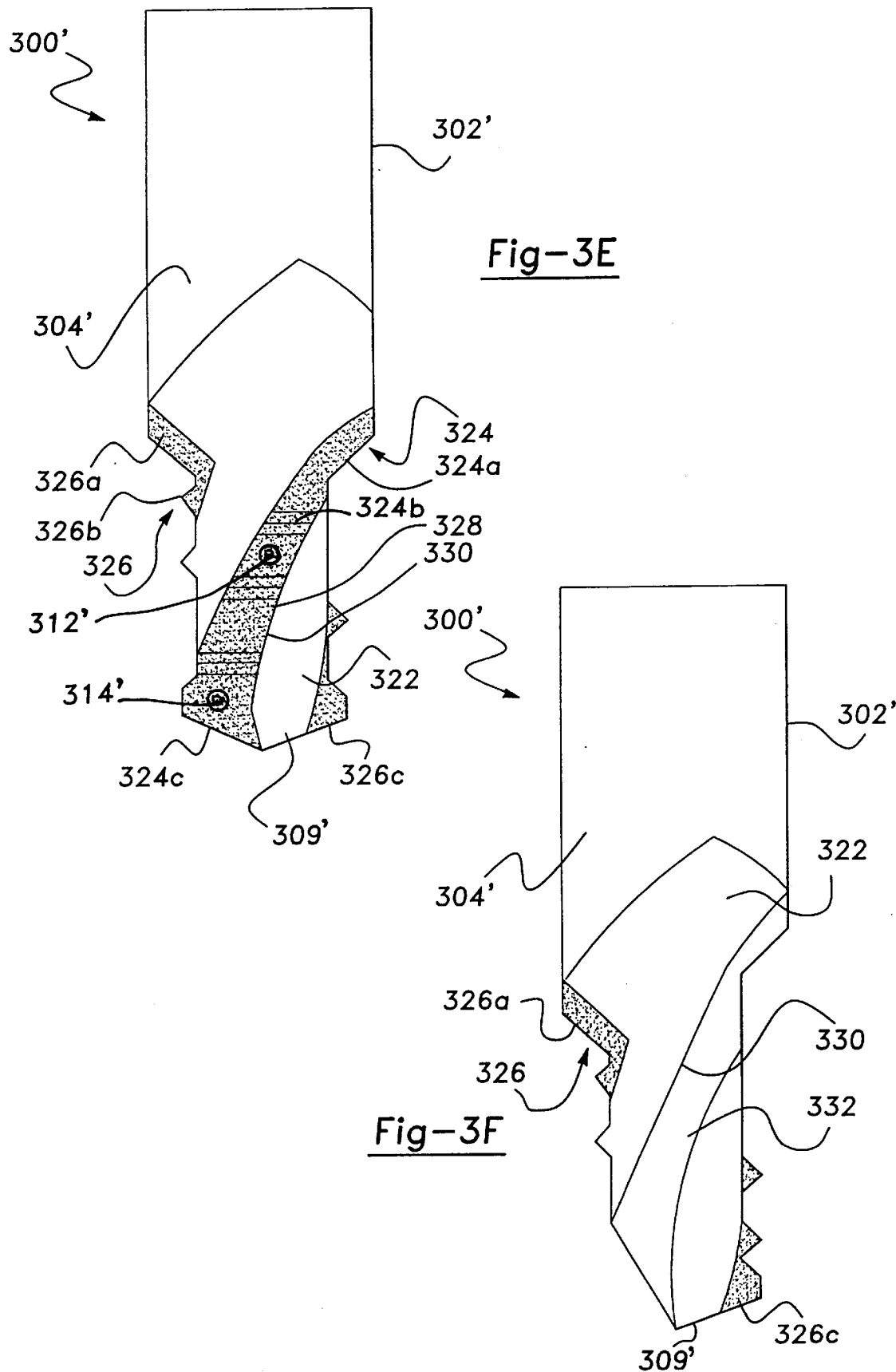

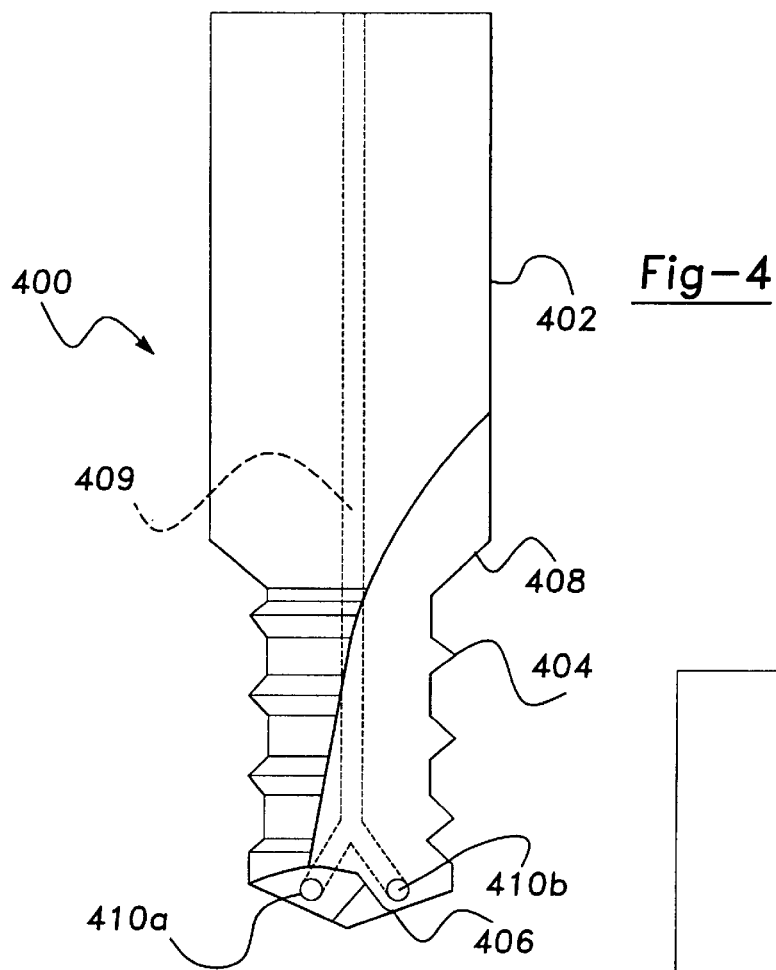
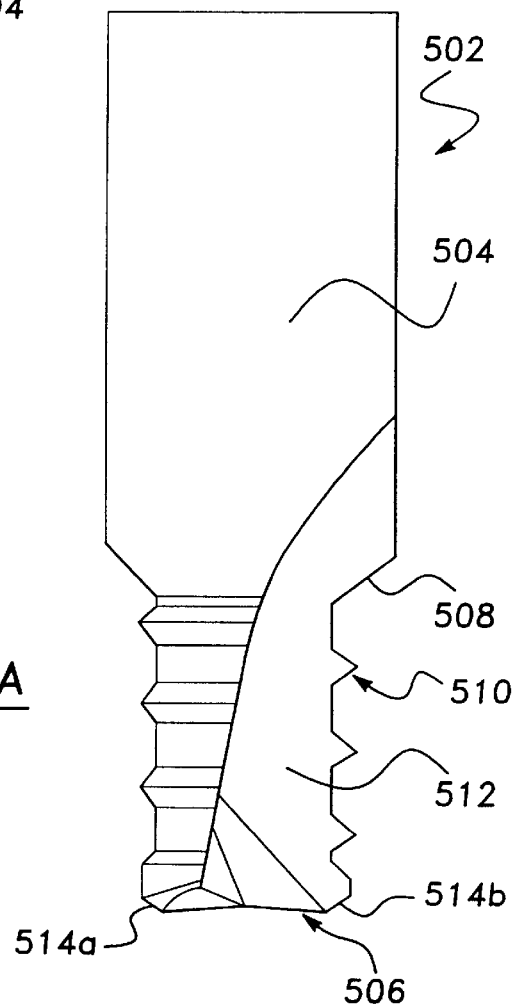

COMBINED HOLE MAKING, THREADING, AND CHAMFERING TOOL WITH STAGGERED THREAD CUTTING TEETH

CROSS-REFERENCE TO RELATED APPLICATION

This application is a continuation-in-part of International Application No. PCT/US96/14760, which is based on United States Provisional Patent Application Ser. No. 60/003,634, filed Sep. 12, 1995.

BACKGROUND OF THE INVENTION

1. Field Of The Invention

This invention is in the field of cutting tools and processes for making a thread in or on a workpiece. More particularly, this invention relates to combined hole making, threading, and chamfering tools for making a hole, a thread, and/or a thread in a workpiece.

2. The Prior Art

The prior art has employed various tool structures for cutting holes, threads, and/or chamfers in a workpiece. Application and performance specifications of cutting tools influence manufacturing designs and processes, such as in the high speed machining art. Problems with prior art cutting tool structures include limitations of their use and/or inconsistent performance in the manufacturing process. For example, cutting conditions can cause the cutting tool to break, to diminish its performance, to deflect and produce poor results, and/or to cause cutting edges to lose their effectiveness due to increased wear.

U.S. Pat. No. 4,761,844, incorporated herein by reference, relates to a combined hole making and threading tool for drilling a hole in a workpiece on the inward feed of the tool and for threading the hole. The tool comprises a straight body with a hole making means such as a drill point or center cutting end mill feature at the forward end, a shank at the rearward end, and a thread form mill between the hole making means and the shank. U.S. Pat. No. 5,429,459, also incorporated herein by reference, relates to a method of and apparatus for thread mill drilling.

FIG. 1 is a prior art combined hole making and threading tool, generally illustrated as 100, having a shank 102 at one end, a drill point 104 at the forward end, and a thread-form mill 108 intermediate the drill point 104 and the shank 102. The thread-form mill 108 is provided with a multiplicity of thread-form cutters 112 and one or more flutes 110 extending from the drill point 104 throughout the thread-form mill 108 for the purpose of chip removal. Each thread-form cutter 112 comprises a number of cutter segments 114a and 114b circumferentially aligned and separated by the intervening flute 110. Each of the thread-form cutters 112 is of annular configuration. The number of thread-form cutters 112 is preferably equal to or greater than the number of threads to be cut. During a thread cutting phase, the thread cutting segments 114a and 114b are laterally displaced into the wall of the hole. As the tool rotates, threads (not shown) are cut in the wall of the hole in the workpiece, generating cutting forces that act on the tool 100, including the thread-form mill 108.

The resulting thread-cutting forces can result in deflection in the tool, thus diminishing the thread tolerance. Under certain applications, such forces can limit the feed rate at which the tool can operate, and increase the thread cutting time, and/or cause the tool to break. What is needed is a cutting tool design that will overcome such prior art problems.

Although certain prior art thread cutting tools may have incorporated flat thread cutting inserts, such tools have limited applications. For example, prior art thread cutting inserts are flat, do not have helical angles, and suffer from the disadvantages of convention (non-staggered) thread cutting edges. Furthermore, such thread cutting inserts are not suitable for hole making cutting edges or chamfering cutting edges. Also, prior art flat thread cutting inserts are not suitable for use with combined hole making, threading, and chamfering tools, particularly combination tools with helical thread cutting teeth.

Another problem with prior art thread cutting tools and combined hole making, threading and chamfering tools concerns the wear of the cutting edges, manufacturing of such tools, and replacement costs. For example, such tools are manufactured from carbide and require precise grinding to form the hole making, threading, and/or chamfering cutting edges. After the cutting edges have excessive wear, the entire carbide tool must be replaced, and it is typically necessary to grind another carbide tool with the desired cutting geometries. Replacement of the entire cutting tool for wear on a small portion of the tool substantially increases associated operating costs.

SUMMARY OF THE PRESENT INVENTION

It is accordingly the general object of the present invention to provide a cutting tool which overcomes the above-identified disadvantages of the prior art (as well as others).

More particularly, it is an object of the present invention to provide a cutting tool which includes a cutting surface that is defined by a staggered or offset array of teeth.

A further object of the present invention is to provide such a tool which advantageously uses the staggered or offset arrangement of teeth to minimize the number of teeth necessary to perform the hole forming operation.

It is an additional object of the present invention to provide such a tool which includes a pair of opposed sets of teeth which are staggered or offset with respect to each other.

An additional object of the present invention is to provide such a tool which optionally has a pair of pockets formed on opposing sides of the tool for releasable and replaceable attachment thereto of cutting inserts.

Still a further object of the present invention is to provide such a tool in which the optional inserts may be of various shapes and helixes.

Yet a further object of the present invention is to provide such a tool which demonstrates minimal chatter.

Still an additional object of the present invention is to provide such a tool which is made highly versatile by providing a single tool having insert-receiving pockets which may be used to receive a variety of different types of inserts, thus minimizing the operating or perishable tool cost.

These and other objects are provided in the present invention which provides a combined hole making, threading, and chamfering tool with staggered thread cutting teeth. The staggered tooth doubles chip thickness and reduces side forces. The staggered arrangement of the thread cutting teeth reduces the number of teeth engaged in a workpiece during the thread milling phase, resulting in less engagement, thus allowing the feed rate to be increased and the thread milling time to be reduced. Optionally provided are removable inserts which may be removed from a like number of pockets formed on the tool itself. The cutting inserts may be replaced or may be substituted with other cutting inserts of different configurations allowing for different thread pitches, lengths and position, and different chamfer or counterbore features.

BRIEF DESCRIPTION OF THE DRAWINGS

FIG. 1 shows a side view of a prior art combined hole making and threading tool.

FIG. 2 is a side view of a combined hole making, threading and chamfering tool with staggered thread cutting teeth according to the present invention.

FIG. 3E is a side view of an alternate embodiment of the combined hole making, threading and chamfering tool of FIG. 3A but illustrating a modified form of the cutting insert.

FIG. 3F is a side view of the tool similar to FIG. 3E but illustrating the tool without the inserts in position.

FIG. 4 is a side view of a combined hole making, threading chamfering tool staggered thread cutting teeth and coolant passage according to another aspect of the present invention.

FIG. 5A is a side view of a combined hole making, threading chamfering tool with staggered thread cutting and an end mill hole making geometry.

DETAILED DESCRIPTION OF THE INVENTION

Figure 3A:
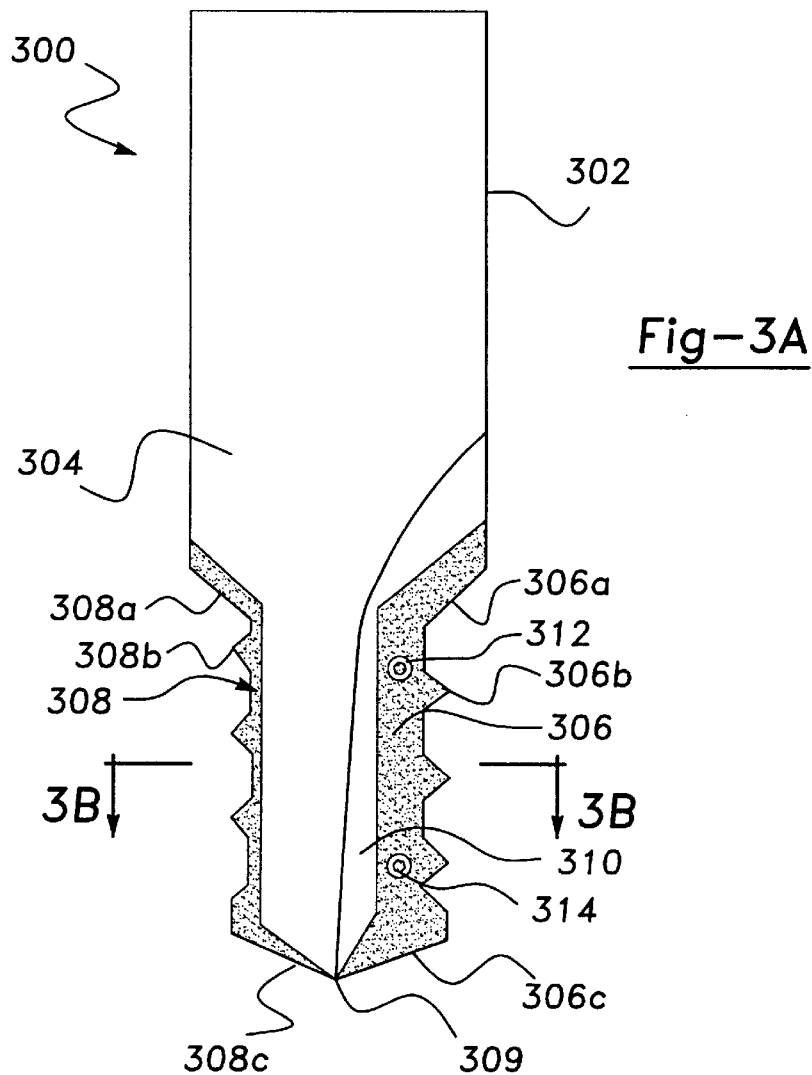
FIG. 3A is a side view of a combined hole making, threading and chamfering tool with cutting inserts including staggered thread cutting teeth.

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Referring to FIG. 1, and as discussed above, a prior art combined hole making and threading tool, generally illustrated as 100, is illustrated. The tool 1 00 includes a shank 102 at one end, a drill point 104 at the forward end, and a thread-form mill 108 intermediate the drill point 104 and the shank 102. A plurality of thread-form cutters 112 and one or more flutes 11 0 are formed on the threadform mill 108. Each thread-form cutter 112 comprises a number of cutter segments 114a and 114b.

FIG. 2 is a side view of a combined hole making, threading and chamfering tool with staggered thread cutting teeth according to the present invention. FIG. 2 illustrates a combined hole making and threading tool, generally illustrated as 200, having a shank 202 for engagement in a holder (not shown) of a machine system (not shown). The tool 200 further includes a hole making means 204 for making a hole in a workpiece (not shown). As is known, the hole formed in the workpiece includes a wall. At least one flute 208 is formed on the tool 200 and extends from the shank 202 to the hole making means 204 defining a first land 210. The first land 210 has a thread cutting edge 212 formed between the shank 202 and the hole making means 204. Another flute (not shown) extends from the shank 202 to the hole making means 204 forming a second land (not shown). A thread cutting edge 214 is formed between the shank 202 and the hole making means 204. The thread cutting edge 212 is offset by at least one pitch from the thread cutting edge 214 to define staggered thread cutting teeth between the shank 202 and the hole making means 204.

Solid tungsten carbide is the popular material for these combination tools. High resultant side forces on the tool during the thread milling phase are caused by relatively high circumferential engagement of the tool and very low feed per tooth (chip thickness). The staggered thread cutting teeth double chip thickness and reduce side forces, resulting in less engagement and providing more mass to generated chips to carry away heat generated in the cutting process as well as reducing the tendency of materials to "brinell" or harden from insufficient chip load or thickness of cut. Consequently, the feed rate may be increased, thereby reducing the thread milling time. This also reduces tool chatter, thus providing a smoother surface finish in the thread. The staggered arrangement of the thread cutting teeth reduces the number of teeth engaged in a workpiece during the thread milling phase.

The relationship between chip removal versus force is non-linear. As chip removal increases, the forces acting on the cutting edges increases at a lesser rate. The alternating (staggered) cutting teeth arrangement of the present invention reduces the force acting on the thread milling portion of the cutting tool. This reduces the force exerted on the thread portion of the cutting tool. Although each thread cutting tooth will remove additional workpiece material, the force acting on the tool does not increase by the same margin. Also, because the number of the thread cutting teeth is reduced, the forces acting on the thread portion is also reduced.

In operation, a chamfer 206 will chamfer the hole, counterbore, or bore formed by the hole making means 204. The chamfer cutting edge can also include forming a spot face or other desired geometry as may be obvious to one skilled in the art. An end mill 506 can be used to mill a chamfer, counterbore, bore, make a hole, and/or mill any other desired geometry in or on a workpiece. An optional feature of the present invention, coolant passages (discussed below) may be provided for assisting in chip removal. The holder of the machine system can replace or augment the chamfer or coolant passage features of the cutting tool.

FIG. 3A is a side view of a combined hole making, threading and chamfering tool with staggered thread cutting inserts according to another aspect of the present invention. FIG. 3A shows a combined hole making, threading, and chamfering tool, generally illustrated as 300, having a shank 302 for engagement in a holder of a machine system (not shown) and a body 304 extending from the shank 302. The body 304 has a first flute 310 and a corresponding cutting insert 306 attached by any suitable means, including fasteners such as screws 312 and 314. The body 304 further includes a second flute (not shown) having a corresponding cutting insert 308 similarly attached by any suitable means, including fasteners such as screws (not shown). The cutting inserts 306 and 308 each includes a hole cutting edge 306c, 308c, a thread cutting edge 306b, 308b, and a chamfering cutting edge 306a, 308a. The tool 300 includes a hole cutting end 309.

Figure 3B:
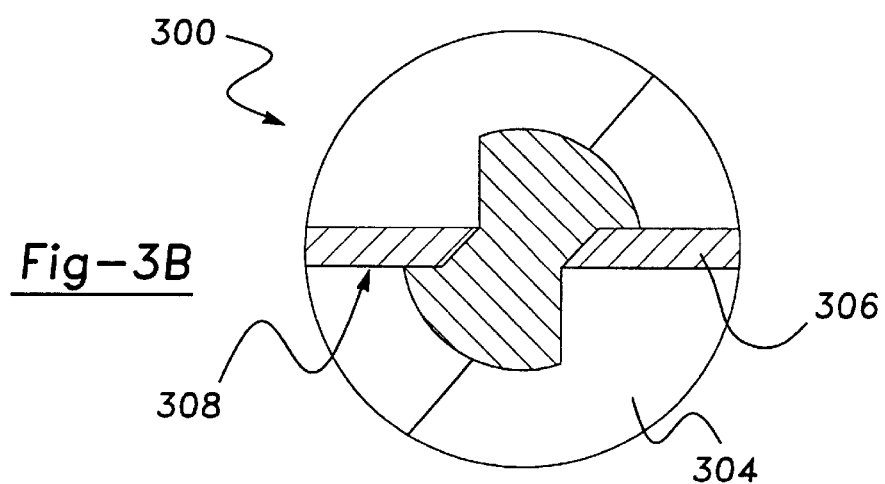
FIG. 3B is a cross-sectional view of the tool of FIG. 3A taken along line 3B—3B.

FIG. 3B is a cross-sectional view of the tool 300 taken along line 3B—3B of FIG. 3A. This view illustrates the nesting relationship between the cutting inserts 306 and 308 and the body 304.

Figure 3C:
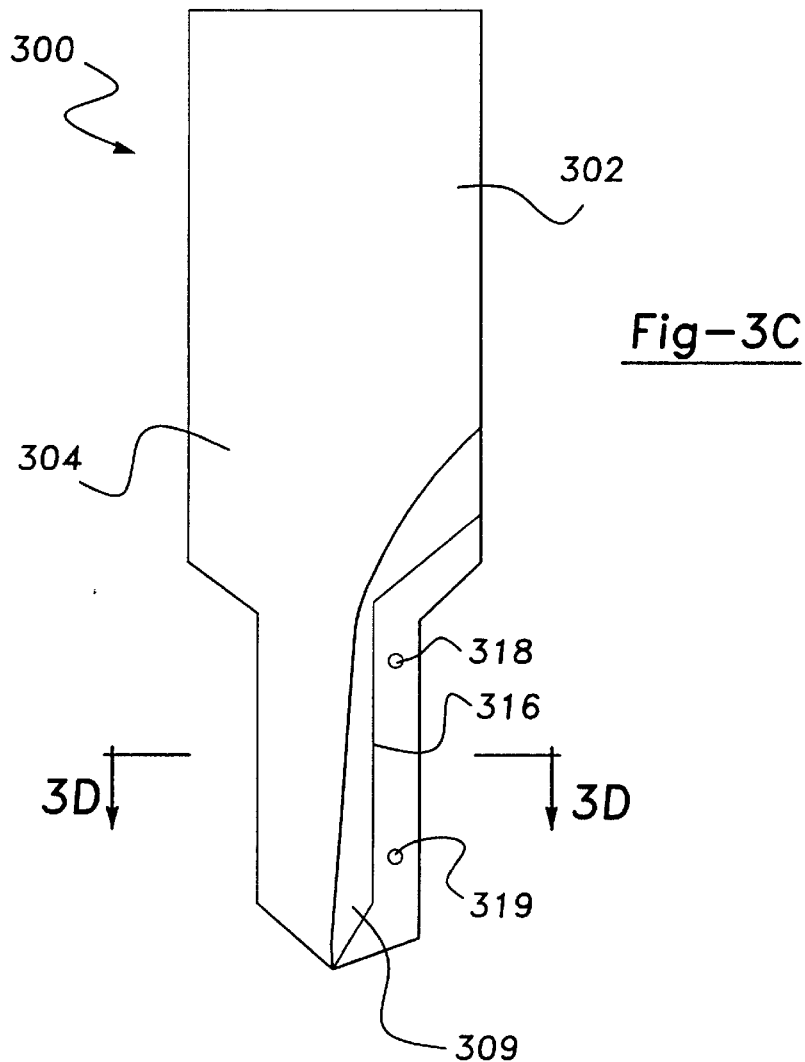
FIG. 3C is a view of the tool similar to FIG. 3A but illustrating the tool without the inserts in position.

FIG. 3C is a view of the combined hole making, threading and chamfering tool 300 of FIG. 3A, but shown without the cutting inserts 306 and 308. This view is useful in illustrating the pockets into which the inserts are removably inserted. Particularly, a pocket 316 is formed in the body 304 and is defined in a substantially axial orientation along the long axis of the tool 300 between the shank 302 and the hole cutting end 309. The insert 306 is removably and selectively insertable into the pocket 316. A pair of fastener apertures 318, 319 are formed in one wall of the pocket for attachment of the screws (or similar fasteners) 312, 314. A second pocket 320 (shown in FIG. 3D) is also preferably provided and is also defined in a substantially axial orientation along the long axis of the tool 300 between the shank 302 and the hole cutting end 309. It is to be understood that while the arrangement of the pockets 316 is defined according to the illustration of FIG. 3C, alternate arrangements, such as a wider pocket, a narrower pocket, or a greater or lesser number of pockets, is possible to suit the particular application of the tool 300. In the same regard, the pockets 316 may be angled with respect to the long axis of the tool 300.

Figure 3D:
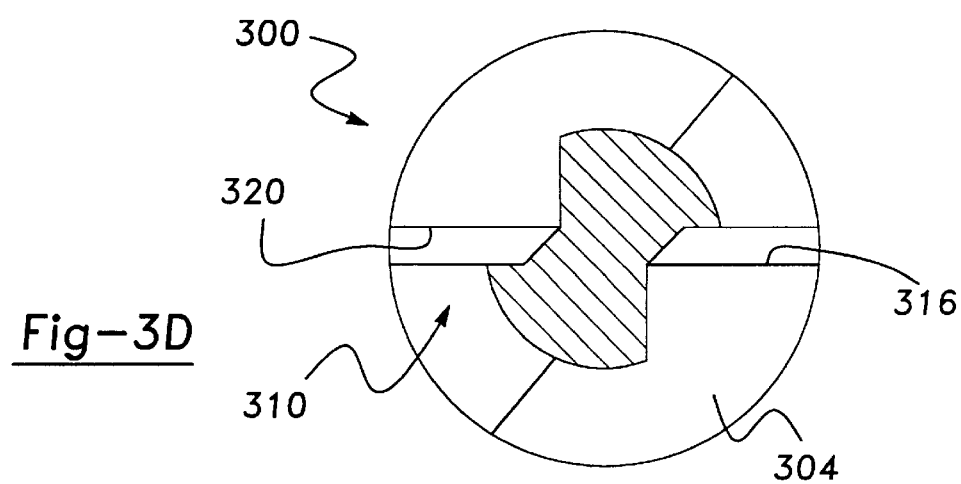
FIG. 3D is a cross-sectional view of the tool of FIG. 3C taken along line 3D—3D.

FIG. 3D is a cross-sectional view of the tool 300 taken along line 3D—3D of FIG. 3C. With the inserts 306 and 308 removed, this view illustrates the configuration of the pockets 316 and 320.

An example of one possible alternate arrangement of the pockets and inserts is illustrated in FIGS. 3E and 3F. FIG. 3E is a side view of an alternate embodiment of the tool illustrated in FIGS. 3A and 3B. Specifically, FIG. 3E shows a combined hole making, threading, and chamfering tool, generally illustrated as 300', having a shank 302' for engagement in a holder of a machine system (not shown) and a body 304' extending from the shank 302'. The body 304' has a first flute 322 partially defined by a cutting insert 324 attached by fasteners such as screws 312' and 314'. The body 304' further includes a second flute (not shown) having a corresponding cutting insert 326 again attached by fasteners such as screws (not shown). The cutting inserts 324 and 326 each includes a hole cutting edge 324c, 326c, a thread cutting edge 324b, 326b, and a chamfering cutting edge 324a, 326a. The tool 300' includes a hole cutting end 309'.

The inserts 324 and 326 are preferably substantially identical in construction and shape, hence only the insert 324 will be described herein. In the embodiment of FIG. 3E, the insert 324 includes a helically-shaped wall 328 which rests against and substantially nests with a helically-shaped wall 330 of the flute 322 formed on the body 304' between the shank 302' and the cutting end 309'.

FIG. 3F is a view of the combined hole making and threading tool 300' of FIG. 3E, but showing the cutting insert 324 removed. This view is useful in illustrating the pockets into which the inserts 324 and 326 are removably inserted. Particularly, a pocket 332 is formed in the body 304' which extends in a substantially axial orientation along the long axis of the tool 300' between the shank 302' and the hole cutting end 309'. The insert 324 is removably and selectively insertable into the pocket 332. In a manner similar to the embodiment of FIGS. 3A–3D, a pair of fastener apertures (not shown) are formed in one wall of the pocket for attachment of the screws (or similar fasteners).

The combined hole making, threading and chamfering tool 300 can have one or more flutes, with each flute having corresponding one or more cutting inserts, such as a hole cutting insert, a thread cutting insert, or a chamfering cutting insert. Flutes and corresponding cutting inserts can be disposed at any desirable angle, including helical and non-helical angles. Thread cutting inserts can have either standard or non-standard thread forms (e.g., staggered thread cutting teeth). Hole cutting inserts can also be used to form any desired geometry, including drill points, end mills, or inverted hole cutting edges.

For example, a thread cutting tool or a combined hole making, threading and chamfering tool may have one or more helical flutes for receiving one or more helical thread cutting inserts with either staggered or not staggered thread cutting teeth. A combined hole making, threading and chamfering tool may have other pockets for receiving a chamfer cutting insert and/or a hole making cutting insert. In certain applications, there may be uneven wear or it may be desirable to have different cutting profiles. This embodiment permits the user to replace any variation of the three inserts (multiple inserts), without disposing of the entire tool, depending on the wear or desired thread profile.

In another embodiment, the cutting insert may have three sections—a helical thread cutting segment, a chamfer cutting segment, and a hole making cutting segment. The chamfer cutting segment and hole making segment may also be helical. The helical thread cutting segment may include either staggered or not staggered thread cutting teeth. This embodiment permits the user to replace the cutting insert only, without disposing of the entire tool. For example, the same tool can be used with different cutting inserts having selected cutting profiles, including variations of staggered thread cutting teeth profiles.

It may be necessary to register the thread cutting inserts in the body of the tool for accurate thread cutting in or on the workpiece. For example, the staggered thread cutting teeth on the inserts may have to be registered for alignment with companion thread cutting inserts. If the thread cutting teeth are not properly aligned, and are out of phase, then the threads which are subsequently cut in the workpiece may be out of tolerance or not useful. To alleviate this concern, in certain applications it may be desirable to include a single insert which includes two or more lands each having a plurality of teeth defining a cutting edge. The insert may also include a hole making cutting segment and a chamfer cutting segment. Further, the cutting insert may have either standard or staggered thread cutting teeth.

In other anticipated variations, the total number of thread cutting teeth may be less than the number of threads or grooves to be cut. Additionally, the body of the tool and the cutting inserts may be the same or dissimilar materials. For example, the body may be steel and the cutting inserts may be either carbide or steel. Further, in certain applications the thread forming portion of the tool may have a maximum diameter which is no greater than the hole forming portion of the tool.

The invention includes variations in the tool or insert geometries to accommodate different processes for making either a hole, threads, chamfer, countersink, counterbore, and the like in or on a workpiece. Depending on the application, the tool can be fed into the workpiece either linearly or by simultaneous multi-axis interpolation, including helical interpolation. Chamfers can be formed either in the downward or outward feed of the tool. Threads can be formed simultaneously with helical hole making.

According to an embodiment of the invention, simultaneous, multi-axis helical interpolation of the tool can be used for making a hole in a workpiece which is greater than the tool diameter. The tool may be interpolated in more than three axes (such as four or five axes) to produce a conical or tapered hole and/or thread in a workpiece. Circular interpolation can be used for making a chamfer, counterbore or other combination features such as a counterbore, chamfer and seal face for various hydraulic or pneumatic fittings in a workpiece.

FIG. 4 is a side view of a combined hole making and threading tool, generally illustrated as 400, with staggered thread cutting teeth and a coolant passage according to another aspect of the present invention. According to this embodiment of the invention, the combined hole making and threading tool 400 includes means for supplying coolant to remove chips. The combined hole making and threading tool 400 has a shank 402, a hole making means 406, a plurality of staggered thread cutting teeth 404 disposed between the shank 402 and the hole making means 406, and a chamfer cutting means 408 disposed between the shank 402 and the staggered thread cutting teeth 404. A main coolant passage 409 (indicated by broken lines) is formed through the tool 400 and preferably includes branch passages 410a and 410b for directing a cooling liquid (such as oil or water) under pressure to the hole making means 406 and/or any other cutting feature for cooling and to aid in chip removal.

FIG. 5A is a side view of a combined hole making, threading and chamfering tool, generally illustrated as 502, having staggered thread cutting teeth and an end mill hole-making geometry. The tool 502 includes a shank 504, a hole making means 506, a plurality of staggered thread cutting teeth 510 formed between the shank 504 and the hole making means 506, chamfer cutting means 508 formed between the shank 50teeth the plurality of staggered thread cutting teeth 520, and at least one flute 512. As illustrated, the hole making means includes edges 514a and 514b which can be used for chamfering a hole in the workpiece.

Figure 5B:
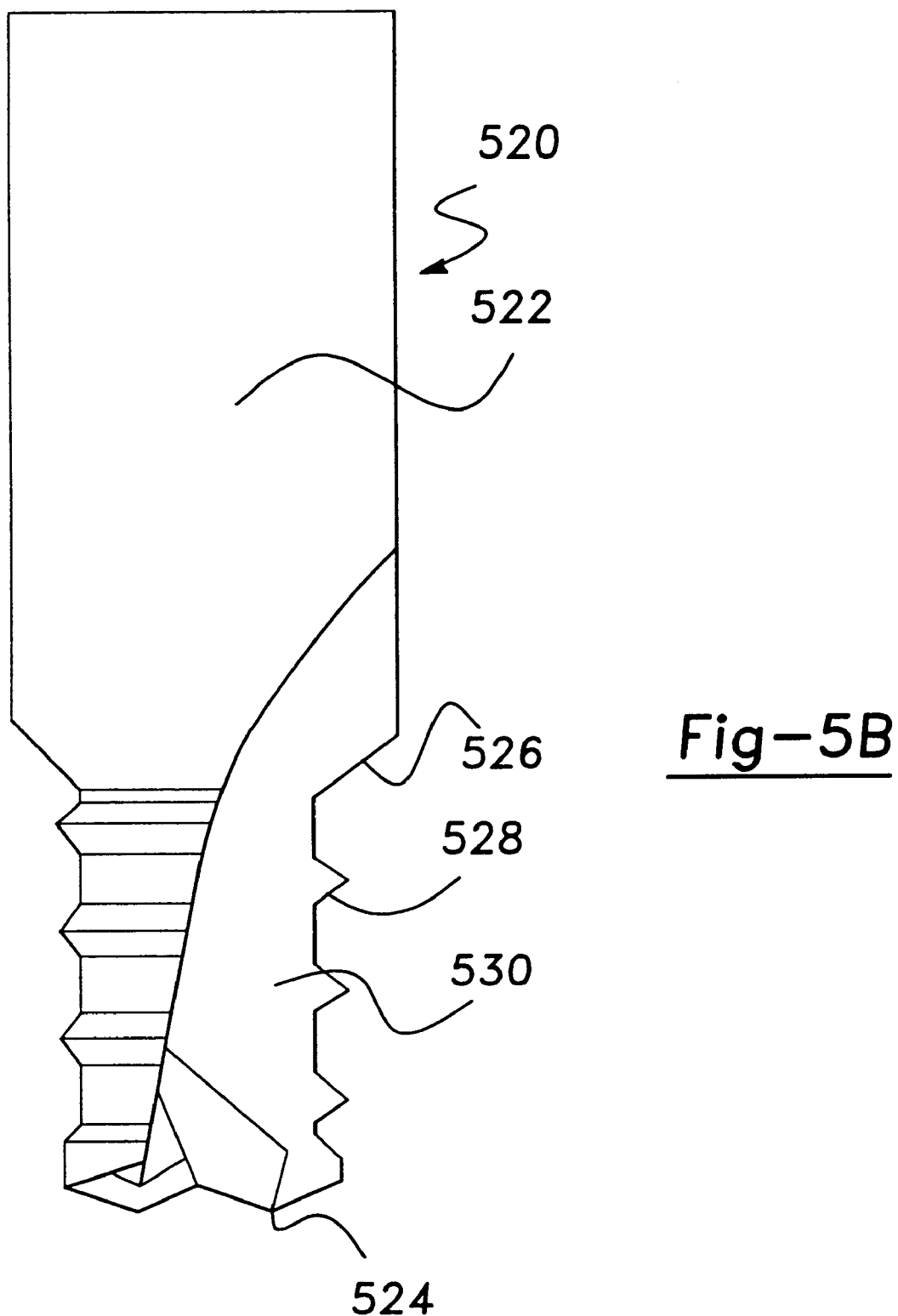
FIG. 5B is a side view of a combined hole making, threading chamfering tool with staggered thread cutting teeth and an inverted hole making geometry.

FIG. 5B is a side view of a combined hole making, threading and chamfering tool, generally illustrated as 520, having staggered thread cutting teeth and an inverted hole making geometry. The tool 520 includes a shank 522, a hole making means 524, a plurality of staggered thread cutting teeth 528 formed between the shank 522 and the hole making means 524, chamfer cutting means 526 formed between the shank 522 and the plurality of staggered thread cutting teeth 528, and at least one flute 530. The hole making means 524 may be a drill point (e.g., 204), an end mill 506, or any other hole cutting geometry, including the illustrated inverted hole cutting edge 524.

The cutting edges of the present invention can be coated with materials to improve performance and increase tool life. Such applied coatings may include wear resistant, corrosion resistant and erosion resistant materials, including ultra hard materials. For example, diamond, diamond-like carbon, or CBN materials may be applied to the cutting edges for improved performance.

In another form, the present invention provides a method of making a hole, thread, chamfer, countersink, and/or counterbore in a workpiece using a combined hole making, threading, and chamfering tool which may include staggering thread cutting teeth and/or cutting inserts. The method generally includes the following steps:

1. Providing an elongated tool having an axis of rotation, a hole making means at one end, a thread making means on the side thereof, and chamfer cutting means disposed adjacent said thread making means, the hole making means, thread making means, and chamfering means may be embodied in one insert or multiple inserts, the thread making means may include staggered thread cutting teeth.

2. Rotating the tool about the axis of rotation while using circular interpolation to form a spot face, counterbore, chamfer or other combination feature at the entry of the hole in a workpiece.

3. Continuing to rotate the tool about the axis of rotation while feeding (shifting) the tool by simultaneous multi-axis interpolation, including helical interpolation, into the workpiece to form a hole and thereafter a thread in the case of the thread making means being no greater than the hole making means, or simultaneously a hole and thread in the case of the thread making means being greater than the hole making means.

4. Retracting the tool to the center of the hole and withdrawing the tool from the workpiece.

Having described the invention, however, many modifications thereto will become apparent to those skilled in the art to which it pertains without deviation from the spirit of the invention as defined by the scope of the appended claims.

What is claimed is:

1. A workpiece forming tool comprising:

a shank for engaging a holder of a machine system;

a first land including a first thread cutting edge; and a second land including a second thread cutting edge, said first thread cutting edge and said second thread cutting edge being spaced apart 180 degrees;

said first thread cutting edge being offset from said second thread cutting edge so as to define a plurality of staggered thread cutting teeth, said tool further comprising at least one removable insert, said first and second cutting edges formed on said at least one removable insert.

2. The tool according to claim 1, further comprising a hole making means operatively associated with said shank for making a hole in the workpiece.

3. The tool according to claim 2, further comprising a chamfer cutting edge operatively associated with said shank for forming a chamfer on said hole.

4. The tool of claim 1, wherein said at least one removable insert comprises first and second removable inserts, said first and second cutting edges formed on said first and second removable inserts, respectively.

5. The tool of claim 1, wherein said first and second lands extend from said shank at a helical angle.

6. A combined hold making, threading a chamfering tool for forming a hole in a workpiece, the hole having a wall with threads and a chamfer, the tool comprising:

a shank for engagement in a holder of a machine system;

a body extending from said shank, said body having an outer surface and a distal end;

hole making means formed on said distal end of said body;

at least one flute formed on said outer surface of said body, said at least one flute extending longitudinally from said shank to said hole making means;

a cutting insert-receiving picket formed on said at least one flute;

at least one cutting insert removably attached to said cutting insert-receiving pocket, said cutting insert comprising a thread making cutting edge for forming the threads of the hole, said at least one cutting insert further includes a chamfer cutting edge for forming the chamfer of the hole.

7. The tool according to claim 6, wherein said at least one cutting insert includes a hole making cutting edge for forming the wall of the hole.

8. The tool of claim 7, wherein said body includes at least one pocket for receiving said at least one cutting insert.

9. The tool according to claim 8, wherein said insert defines a helical angle and wherein said at least one insert pocket has a helical angle.

10. The tool according to claim 6, further including coolant passage means.

11. The tool of claim 6, wherein said at least one cutting insert comprising first and second cutting inserts, said first and second cutting inserts including staggered thread cutting teeth.

12. A combined hole making, threading and chamfering tool for forming a hole in a workpiece, the hold having a wall with threads and a chamfer, the tool comprising:
- a shank for engagement in a holder of machine system;
- a body extending from said shank, said body having a distal end;
- hole making means formed on said distal end of said body;
- a first flute extending from said shank to said hole making means, said first flute defining a land having at least two staggered thread cutting edges axially offset at least two pitches apart and operative for cutting threads in the hole; and
- a second flute extending from said shank to said hole making means, said second flute defining a land having at least two staggered thread cutting edges axially offset at least two pitches apart and operative for cutting threads in the hole, said first flute and said second flute being spaced apart 180 degrees, said cutting edges of said first flute being offset with respect to the cutting edges of said second flute;
- further including at least one removable insert, said thread cutting edges being formed on said at least one removable insert.

13. The tool according to claim 12, further including a first land having a first circumferential plane and a second land having a second circumferential plane, said first circumferential plane being non-coplanar with said second circumferential plane, and wherein one of said at least two staggered thread cutting teeth is disposed on said first land and another of said at least two staggered cutting teeth is disposed on said second land.

14. The tool according to claim 12, wherein said flute extends at a helical angle along said body.

15. The tool according to claim 12, further including at least one cutting insert and at least one fastener for attaching said cutting insert to said body.

16. The tool according to claim 12, wherein said at least one insert includes a hole making cutting edge for forming the wall of the hole.

17. The tool according to claim 12, wherein said at least one insert includes a chamfer cutting edge for forming the chamfer of the hole.

* * * * *